United States Patent
Zhang et al.

(10) Patent No.: US 9,608,905 B1
(45) Date of Patent: Mar. 28, 2017

(54) PACKET PREAMBLE AND SYMBOL BOUNDARY DETECTION

(71) Applicant: MARVELL INTERNATIONAL LTD., Hamilton (BM)

(72) Inventors: Jin Zhang, Pleasanton, CA (US); Xiaolin Che, Shanghai (CN); Yuji Meng, Shanghai (CN); Yicheng Chen, Shanghai (CN); Gang Wang, Shanghai (CN); Kok-Wui Cheong, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 307 days.

(21) Appl. No.: 14/333,444

(22) Filed: Jul. 16, 2014

Related U.S. Application Data

(60) Provisional application No. 61/856,369, filed on Jul. 19, 2013.

(51) Int. Cl.
| | |
|---|---|
| *H04L 12/741* | (2013.01) |
| *H04L 27/26* | (2006.01) |
| *H04W 74/08* | (2009.01) |
| *H04W 56/00* | (2009.01) |
| *H04L 1/00* | (2006.01) |
| *H04L 12/28* | (2006.01) |

(52) U.S. Cl.
CPC ............ *H04L 45/74* (2013.01); *H04L 27/265* (2013.01); *H04L 27/2627* (2013.01); *H04L 1/0001* (2013.01); *H04L 2012/2843* (2013.01); *H04W 56/0005* (2013.01); *H04W 74/0808* (2013.01)

(58) Field of Classification Search
None
See application file for complete search history.

(56) References Cited

U.S. PATENT DOCUMENTS

| | | |
|---|---|---|
| 7,813,436 B1 | 10/2010 | Zhao et al. |
| 8,331,419 B2 | 12/2012 | Zhang et al. |
| 8,619,922 B1 | 12/2013 | Narasimhan |
| 8,711,990 B1 | 4/2014 | Lee et al. |

(Continued)

OTHER PUBLICATIONS

IEEE Std 802.11™ 2012 (Revision of IEEE Std 802. 11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

(Continued)

*Primary Examiner* — Vinncelas Louis

(57) ABSTRACT

A packet is detected in an input data stream. A stream of fast Fourier transform (FFT) blocks are scanned for a plurality of candidate symbols for a preamble of the packet. The stream of FFT blocks correspond to the input data stream. A symbol boundary is detected between adjacent candidate symbols of the plurality of candidate symbols. The FFT blocks are aligned with the symbol boundary. A transition boundary is detected between different adjacent candidate symbols of the preamble based on the detected symbol boundary. A packet detection indication is provided based on the detected transition boundary.

19 Claims, 6 Drawing Sheets

(56) References Cited

U.S. PATENT DOCUMENTS

| | | | |
|---|---|---|---|
| 8,787,505 B1 | 7/2014 | Lee et al. | |
| 8,811,462 B1 | 8/2014 | Zhao et al. | |
| 8,824,610 B1 | 9/2014 | Salhotra et al. | |
| 8,837,617 B2 | 9/2014 | Blasco Claret et al. | |
| 8,842,571 B1 | 9/2014 | Yu et al. | |
| 8,902,726 B1 | 12/2014 | Zhao et al. | |
| 8,902,798 B2 | 12/2014 | Zhang et al. | |
| 8,938,016 B1 | 1/2015 | Ben-Eli et al. | |
| 2001/0036221 A1* | 11/2001 | Sato | H04B 1/70754 375/147 |
| 2009/0161804 A1* | 6/2009 | Chrabieh | H04J 11/0036 375/346 |
| 2011/0014910 A1* | 1/2011 | Yonge, III | H04W 74/0808 455/434 |
| 2014/0376540 A1* | 12/2014 | Zeng | H04W 56/0005 370/350 |

OTHER PUBLICATIONS

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and Metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ad $^{TM}$/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, pp. 1-679 (Jul. 2012).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

Lee et al., "TGaf PHY proposal," *The Institute of Electrical and Electronics Engineers*, doc. No. IEEE 802.11-12/0809r5, pp. 1-43 (Jul. 10, 2012).

\* cited by examiner

PACKET PREAMBLE AND SYMBOL BOUNDARY DETECTION

CROSS-REFERENCES TO RELATED APPLICATIONS

This application claims the benefit of U.S. Provisional Patent Application No. 61/856,369, entitled "Method to detect packet and locate symbol boundary for preamble consisting of periodic symbols" and filed on Jul. 19, 2013, the disclosure of which is incorporated herein by reference.

FIELD OF THE DISCLOSURE

The present disclosure relates generally to packet communication networks and, more particularly, to detection of packets, packet preambles, and symbol boundaries in packet preambles.

BACKGROUND

In modern data communications, for example, communications over power lines, coaxial cables, and wireless, information bits are grouped and encoded into data packets. A packet-based communication network can more efficiently utilize a shared medium. A structure for a typical data packet 100 is shown in FIG. 1. The data packet 100 includes a preamble 102, a packet header 104, and one or more packet payloads 106. The preamble 102 serves to achieve various functions, such as packet detection, symbol boundary detection, and channel estimation.

Turning to FIG. 2, the preamble 102 includes a sequence 201 of preamble symbols. The preamble symbols are often designed with various characteristics to promote the above-mentioned functions. Examples of such characteristics include a flat frequency response, a low peak to average power ratio, and high uniqueness (e.g., the symbol may be a unique word or pattern). Preferably, the preamble symbol is selected to be more easily discoverable under heavily distorted channel conditions and strong noise. In practice, the preamble often includes a polarity transition. In some scenarios, all preamble symbols of the sequence 201 are identical, with the exception that the last one or two preamble symbols are negated. In the example of FIG. 2, the sequence 201 includes six positive symbols 202 and two negative symbols 204 that are separated by a transition boundary 206 (e.g., a transition in a received signal for the preamble 102). The transition boundary 206 may be used to establish a reference point for locating the packet header 104 that follows the preamble 102. Other arrangements of positive symbols and negative symbols are used in various embodiments.

In a conventional receiver, the preamble 102 can be detected by one or more correlators. Two forms of correlators are commonly used: an auto-correlator 300 and cross-correlator 400 as respectively illustrated in FIG. 3 and FIG. 4. The auto-correlator 300 and cross-correlator 400 are temporal correlators. The auto-correlator 300 includes a delay component 302, a multiplier 304, and an accumulator 306. The auto-correlator 300 receives an input signal s(n) and provides the input signal s(n) to the delay component 302 and to the multiplier 304. The delay component 302 introduces a delay of N units to the input signal s(n) (e.g., a duration of time or number of clock signals). The delay component 302 provides a corresponding delayed signal s(n−N) as a reference signal to the multiplier 304, as shown in FIG. 3. The multiplier 304 multiples the signals s(n) and s(n−N) and provides a corresponding multiplied signal to the accumulator 306. The accumulator 306 accumulates the multiplied signal over a predetermined duration, typically a same duration as a preamble symbol period (e.g., a predetermined duration of the preamble 102). The accumulator 306 provides a temporal auto-correlation output signal AR(n).

FIG. 4 shows the cross-correlator 400, in which a delayed input signal is correlated with various local reference signals. The cross-correlator 400 includes a plurality of N delay components 402, a corresponding plurality of N multipliers 404, and an accumulator 406. The cross-correlator 400 receives the input signal s(n) and provides the input signal s(n) to the plurality of N delay components 402. The plurality of N delay components 402 are cascaded to provide respective output signals s(n−1), s(n−2), s(n−3), . . . and s(n−N) to the plurality of N multipliers 404. The plurality of N multipliers 404 also receive a plurality of N reference signals r(0), r(1), r(2), r(3), . . . and r(N−1) and thus provide corresponding multiplied signals to the accumulator 406. The accumulator 406 provides a temporal cross-correlation output signal CR(n).

Both the auto-correlator 300 and the cross-correlator 400 can detect the preamble 102 by detecting a peak in their respective output signals. However, when the preamble 102 is distorted by narrow-band interference or a single-tone interference signal, both correlators may trigger a false alarm and thus claim a detection of a preamble (e.g., preamble 102) when a preamble is not actually present. Narrow-band interference and single-tone interference signals are commonly found in power line channels.

SUMMARY

In an embodiment, a method of detecting a packet in an input data stream is provided. The method includes: scanning a stream of fast Fourier transform (FFT) blocks, corresponding to the input data stream, for a plurality of candidate symbols for a preamble of the packet; detecting a symbol boundary between adjacent candidate symbols of the plurality of candidate symbols and aligning the FFT blocks with the symbol boundary; detecting a transition boundary between different adjacent candidate symbols of the preamble based on the detected symbol boundary; and providing a packet detection indication based on the detected transition boundary.

In another embodiment, a method of detecting a symbol boundary for a preamble of a packet in an input data stream is provided. The method includes: accumulating and determining an average of a plurality of fast Fourier transform (FFT) blocks of a stream of FFT blocks that correspond to the input data stream; determining a frequency domain cross-correlation output based on the average of the plurality of FFT blocks; determining an inverse FFT output of the frequency domain cross-correlation output; and detecting the symbol boundary based on a peak value of the inverse FFT output.

In yet another embodiment, a device that detects a symbol boundary for a preamble of a packet in an input data stream is provided. The device includes a fast Fourier transform (FFT) component, a cross-correlator, an inverse FFT component, and a state machine controller. The fast Fourier transform (FFT) component generates a stream of FFT blocks based on the input data stream. The cross-correlator generates a frequency domain cross-correlation output based on an average of a plurality of the stream of FFT blocks. The inverse FFT component determines an inverse FFT output of the frequency domain cross-correlation output. The state machine controller detects the symbol boundary based on a peak value of the inverse FFT output.

DETAILED DESCRIPTION

In embodiments described below, symbols for a preamble of a packet are detected. In some embodiments, a fast Fourier transform (FFT) is performed on an input data stream to form FFT blocks. In one such embodiment, a frequency domain auto-correlator is used to detect candidate symbols of the preamble within the FFT blocks. In an embodiment, a plurality of candidate symbols are detected with corresponding threshold conditions to reduce false positive detections. In some embodiments, a symbol boundary is detected based on a frequency domain cross-correlation output. In various embodiments, the FFT blocks are aligned based on the detected symbol boundary. In some embodiments, a transition boundary is detected between different adjacent candidate symbols of the preamble based on the detected symbol boundary and a packet detection indication is provided.

Figure 3:
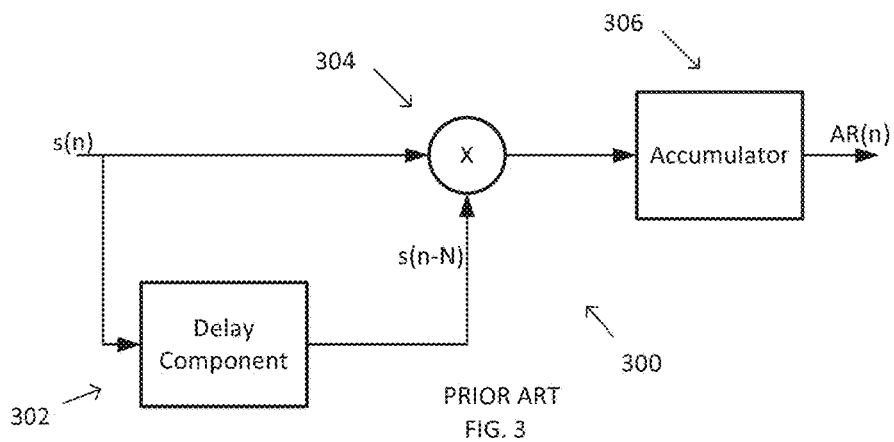
FIG. 3 is a block diagram of an example of an auto-correlator of the prior art.
Figure 4:
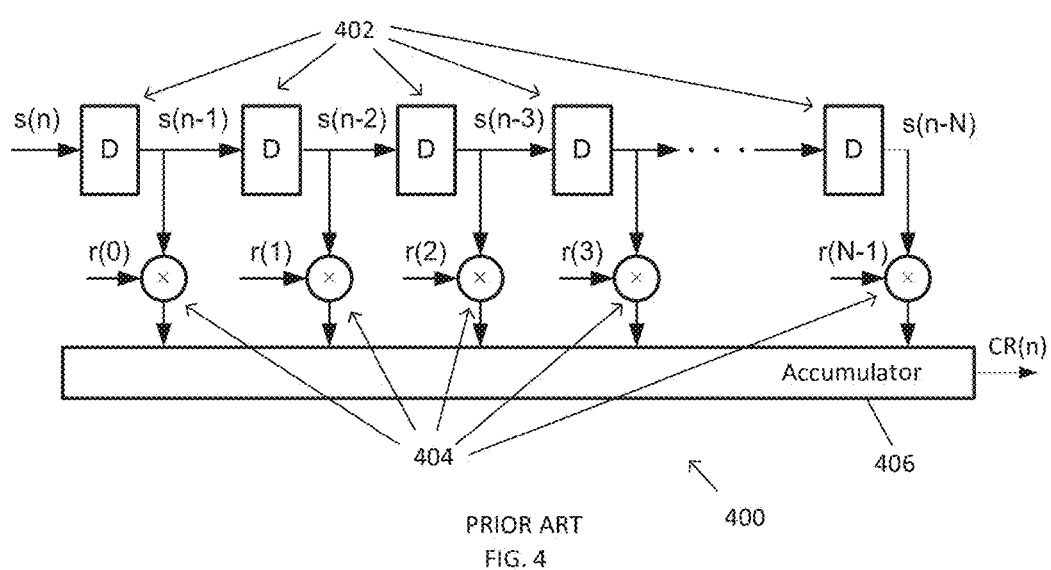
FIG. 4 is a block diagram of an example of a cross-correlator of the prior art.
Figure 5:
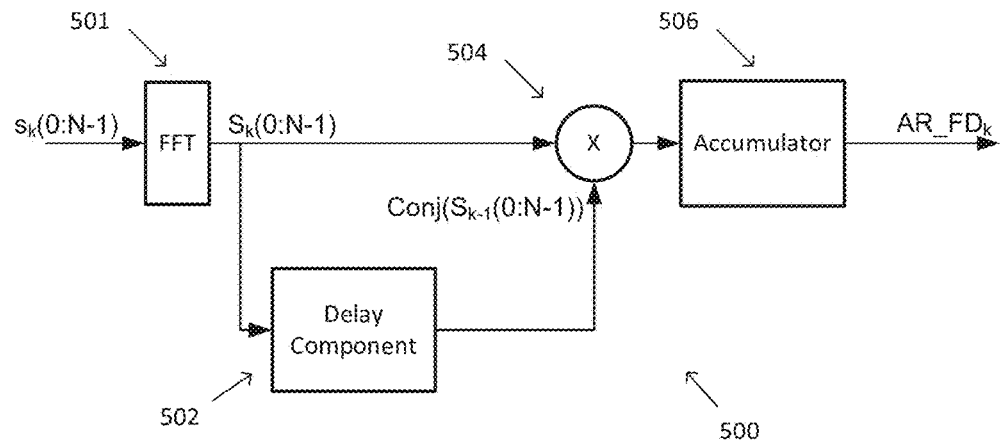
FIG. 5 is a block diagram of an example of an auto-correlator in the frequency domain, according to an embodiment.

The auto-correlator 300 (FIG. 3) and cross-correlator 400 (FIG. 4) are implemented in the time domain and thus provide temporal output signals. On the other hand, FIG. 5 is a block diagram of an example frequency domain auto-correlator 500, according to an embodiment. The auto-correlator 500 provides a frequency domain auto-correlation output signal, according to an embodiment. The auto-correlator 500 includes a fast Fourier transform (FFT) component 501, a delay component 502, a multiplier 504, and an accumulator 506, in an embodiment. The auto-correlator 500 receives blocks of N samples of input signals, shown as $s_k(0:N-1)$. The FFT component 501 transforms each block of input signals into the frequency domain as a block of signals $S_k(0:N-1)$. The delay component 502 provides a conjugate of a delayed block $S_{k-1}(0:N-1)$ to the multiplier 504. The multiplier 504 receives the signals $S_k(0:N-1)$ and $S_{k-1}(0:N-1)$ and provides a multiplied signal to the accumulator 506. The accumulator 506 provides a frequency domain auto-correlation output signal $AR\_FD_k$, which corresponds to an inner product of the blocks $S_k(0:N-1)$ and $\text{Conj}(S_{k-1}(0:N-1))$.

Figure 6:
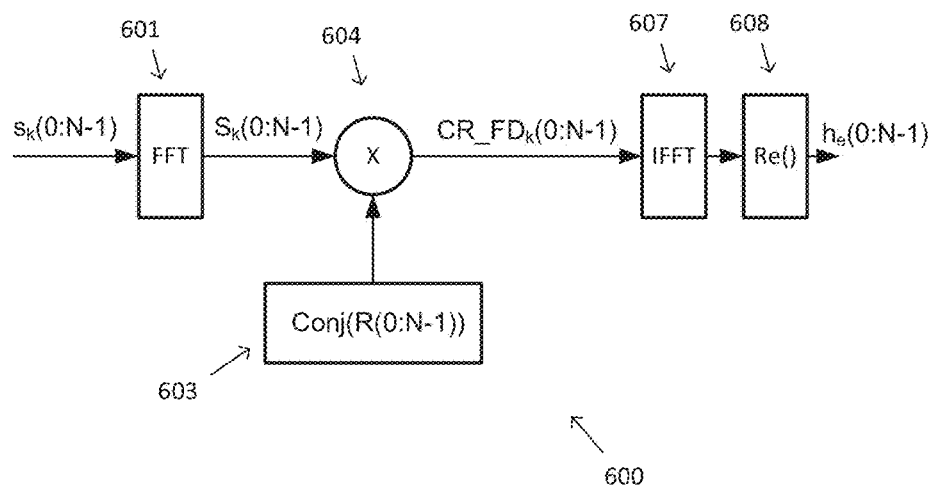
FIG. 6 is a block diagram of an example of a cross-correlator in the frequency domain, according to an embodiment.

FIG. 6 is a block diagram of an example frequency domain cross-correlator 600, according to an embodiment. The cross-correlator 600 includes an FFT component 601, a reference generator 603, a multiplier 604, an inverse FFT component 607, and an extraction component 608. The cross-correlator 600 also receives blocks of N samples of input signals $s_k(0:N-1)$. The FFT component 601 transforms each block of input signals into the frequency domain as a block of signals $S_k(0:N-1)$, provided to the multiplier 604. The reference generator 603 provides a conjugate of a reference block as a block $\text{Conj}(R(0:N-1))$ to the multiplier 604. The multiplier 604 provides an inner product of the blocks $S_k(0:N-1)$ and $\text{Conj}(R(0:N-1))$ as a multiplied signal. The inverse FFT component 607 performs an inverse FFT on the multiplied signal (e.g., a point-wise multiplication signal) from which the extraction component 608 extracts a real part $h_e(0:N-1)$.

Figure 7:
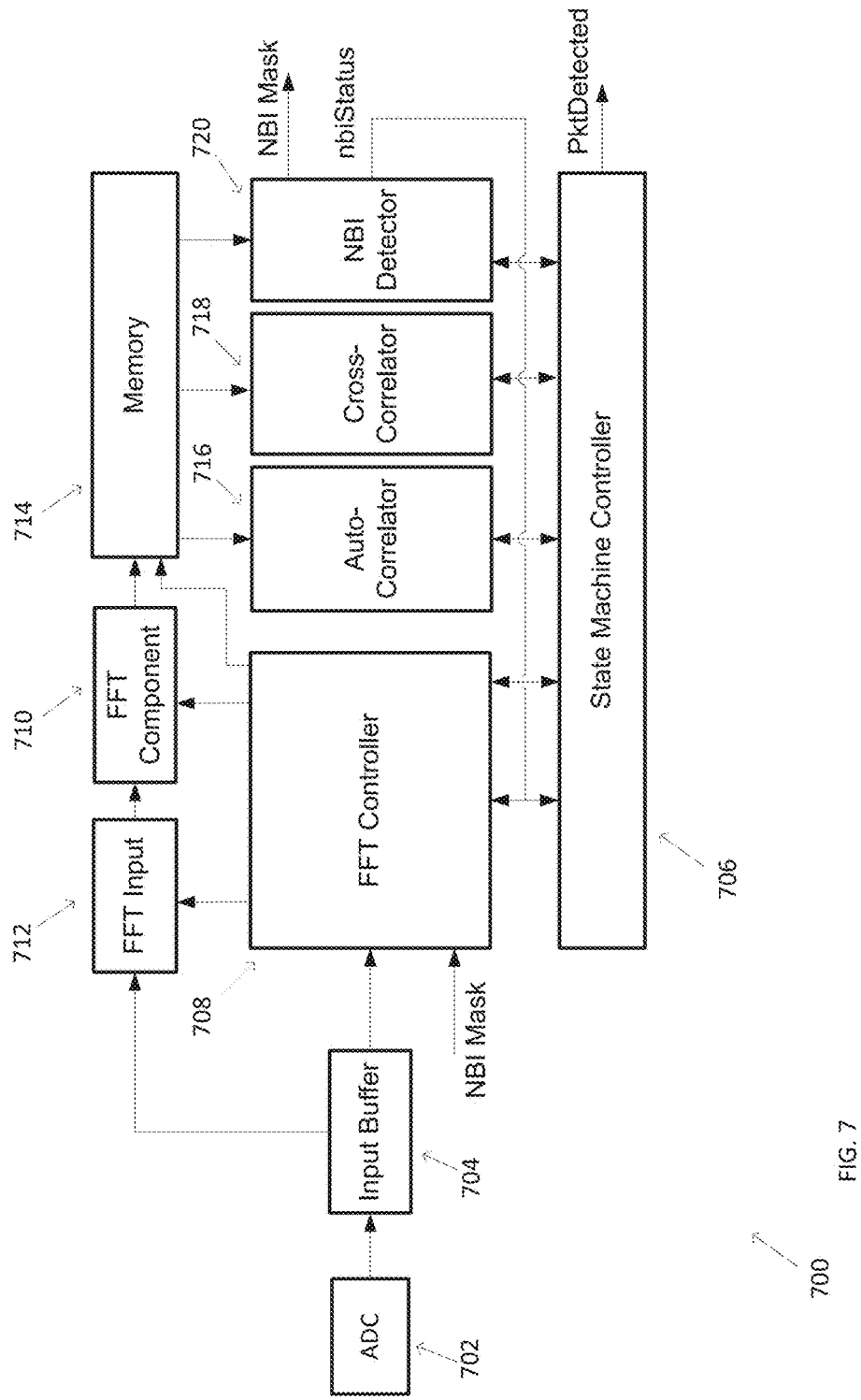
FIG. 7 is a block diagram of an example of packet detector, according to an embodiment.

FIG. 7 is a block diagram of an example packet detector 700, according to an embodiment. As described herein, packet detection and symbol boundary detection is performed jointly using both an auto-correlator and a cross-correlator in the frequency domain, in various embodiments. In some embodiments, the packet detector 700 is configured to implement such techniques. In other embodiments, such techniques are implemented in other suitable packet detectors.

The packet detector 700 includes an analog-to-digital converter (ADC) 702, an input buffer 704, a state machine controller 706, an FFT controller 708, an FFT component 710, an FFT input 712 (e.g., a block buffer), a memory 714, an auto-correlator 716, a cross-correlator 718, and a narrow-band interference (NBI) detector 720. The auto-correlator 716 and the cross-correlator 718 in various embodiments are implemented by the auto-correlator 500 and the cross-correlator 600, respectively. In other embodiments, however, auto-correlator 716 and the cross-correlator 718 are implemented as suitable domain correlators different than the auto-correlator 500 and the cross-correlator 600. One or more portions of the components of the packet detector 700 described herein are implemented as hardware (e.g., a processor or memory), firmware and/or software executed by one or more processor devices, or any suitable combination thereof, in various embodiments. In other embodiments, the components are suitably combined or divided, as will be understood by those skilled in the art.

The ADC 702 provides digitized samples of an input signal s(n) which are stored by the input buffer 704, in an embodiment. Under the control of the state machine controller 706, the FFT controller 708 selects blocks of samples within the input buffer 704 (e.g., blocks of N samples) and sends the selected blocks to the FFT component 710 via the FFT input 712, according to an embodiment. The FFT input 712 in some embodiments uses an adjustable pointer to indicate a start of an FFT block. The pointer is adjusted to align the FFT blocks with candidate symbols, such as described herein. The FFT component 710 performs a fast Fourier transform on the blocks in the FFT input 712 and stores the blocks (e.g., $S_k(0:N-1)$) in the memory 714, in an embodiment.

In the embodiment shown in FIG. 7, the auto-correlator 716 performs auto-correlations on two blocks of FFT signals stored in the memory 714, i.e., $S_k(0:N-1)$ and $\text{Conj}(S_{k-1}(0:N-1))$ and the cross-correlator 718 performs auto-correlation on one block of FFT signals stored in the memory 714.

In various scenarios, the cross-correlator 718 uses an average of several FFT signals in order to enhance receiver sensitivity. In various embodiments, a suitable number of FFT signals are averaged by the FFT component 710 (e.g., prior to storage in the memory 714), by the auto-correlator 716, or by another suitable component.

The NBI detector 720 detects narrow band interference (NBI) signals based on the FFT blocks stored in the memory 714, in an embodiment. Upon detection of NBI signals, the NBI detector 720 generates a signal nbiStatus that indicates that the detection has occurred. In other embodiments, the NBI detector 720 sets a bit, register, or other suitable indicator corresponding to a current value of the nbiStatus. For example, the nbiStatus has a value of "1" when NBI signals are detected and a value of "0" when NBI signals are not detected, according to an embodiment. The NBI detector 720 also generates an NBI Mask indicator, which indicates one or more sub-carrier frequencies that are affected by the detected NBI signals, according to an embodiment. In some embodiments, the NBI Mask indicator is a bit pattern, sequence, or other suitable indicator corresponding to pre-determined sub-carrier frequencies. In various embodiments, if any bit in the NBI indicator is set to 1, the corresponding sub-carrier frequency is excluded from calculations by the auto-correlator 716 and the cross-correlator 718. This approach of exclusion reduces false alarms that may be caused by the narrow band interference.

The state machine controller 706 controls various operations of the packet detector 700 to detect a packet preamble of a packet. In the embodiments described herein, the packet preamble to be detected corresponds to the packet preamble 102 shown in FIG. 2. In some embodiments, the state machine controller 706 performs the operations of the flow diagram 800 of FIG. 8. In various embodiments, the state machine controller 706 transitions between states AR0, AR1, AR2, AR3_INIT, AR_UPD, and AR_DONE. In various embodiments, one or more of the states are combined or additional suitable steps may be added, as will be understood by those skilled in the art.

During one or more of the states of various embodiments, the auto-correlator 716 generates an output for a frequency domain auto-correlation value arFreq and an output for average input power avgNorm. In some embodiments, the auto-correlator 716 generates a mean square value as an indicator of the average input power avgNorm. As described herein, the output names correspond to the state in which they are generated (i.e., arFreq0 is generated in state AR0, arFreq1 is generated in state AR1, etc.). The values for arFreq and avgNorm are stored by one or more of the memory 714, the auto-correlator 716, or the state machine controller 706, and thus a value for arFreq1 from state AR1 is available during subsequent states (e.g., in state AR2), according to various embodiments.

Figure 8:
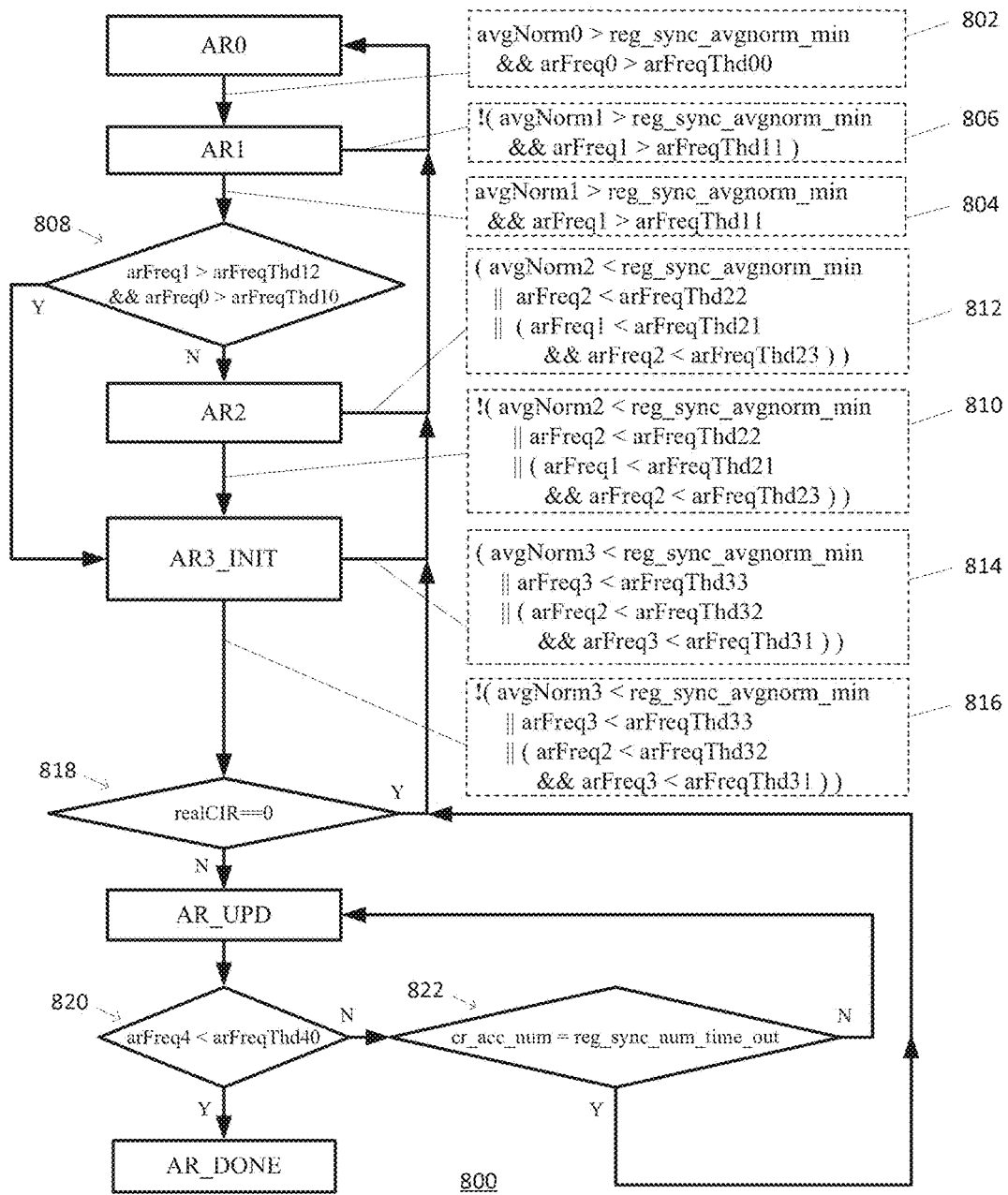
FIG. 8 is a flow diagram of an example method, implemented in the packet detector of FIG. 7, of detecting a packet, according to an embodiment.

In the embodiment shown in FIG. 8, the state machine controller 706 starts at state AR0 to scan for a candidate symbol for the preamble 102. At state AR0, the auto-correlator 716 generates outputs arFreq0 and avgNorm0. During AR0, each FFT block may or may not be aligned with the preamble symbol. The state machine controller 706 monitors first threshold conditions 802 to determine whether the output arFreq0 meets (e.g., is greater than) a first frequency domain auto-correlation threshold arFreqThd00 (e.g., indicating an auto-correlation match for the candidate symbol) and whether the output avgNorm0 meets (e.g., is greater than) a first average power threshold reg_sync_avgnorm_min (e.g., indicating that the received signal has sufficient signal strength). If the first threshold conditions 802 are met, then a candidate symbol for the preamble 102 has been detected and the state machine controller 706 advances to the state AR1.

During state AR1, the auto-correlator 716 continues to generate outputs for the frequency domain auto-correlation output (arFreq1 in AR1) and mean square value (avgNorm1 in AR1). The state machine controller 706 monitors second threshold conditions 804 to determine whether a second candidate symbol has been detected. In the embodiment shown in FIG. 8, the state machine controller 706 determines whether the output arFreq1 meets a second frequency domain auto-correlation threshold arFreqThd11 and whether the output avgNorm0 meets the average power threshold reg_sync_avgnorm_min. If the second threshold conditions 804 are met, then a second candidate symbol for the preamble 102 has been detected and the state machine controller 706 advances towards the state AR2. In some embodiments, the second frequency domain auto-correlation threshold arFreqThd11 is lower than the first frequency domain auto-correlation threshold arFreqThd00. To reduce false positive detections of the preamble 102, if the second threshold conditions 804 are not met and first return threshold conditions 806 are met, then the state machine controller 706 returns to state AR0. In this case, the first return threshold conditions 806 are met if either or both of the frequency domain auto-correlation value arFreq1 and avgNorm1 values are below respective thresholds arFreqThd11 and reg_sync_avgnorm_min. Other return threshold conditions are used in various embodiments.

Prior to entering state AR2, the state machine controller 706 optionally determines (808) whether a bypass threshold condition has been met. In the example of FIG. 8, the bypass threshold condition is met if both arFreq0 and arFreq1 meet respective higher frequency domain auto-correlation thresholds arFreqThd10 and arFreqThd12. In this case, the state machine controller 706 bypasses state AR2 and proceeds to state AR3_INIT, for example, if a detection confidence for the candidate symbols meets a high confidence threshold.

During state AR2, the state machine controller 706 monitors third threshold conditions 810 to determine whether a third candidate symbol has been detected. The third threshold conditions 810 are based on outputs avgNorm2, arFreq2, and arFreq1, the average power threshold, and frequency domain auto-correlation thresholds arFreqThd21, arFreqThd22, and arFreqThd23 as follows:

!(avgNorm2<reg_sync_avgnorm_min
 ‖arFreq2<arFreqThd22
 ‖(arFreq1<arFreqThd21 && arFreq2<arFreqThd23)).

The third threshold conditions 810 help to ensure that the received signal has a suitable average input power and that the current and previous values of the auto-correlation value are suitably matched. If the third threshold conditions 810 are met, then the state machine controller 706 advances to state AR3_INIT. If second return threshold conditions 812 are met, then the state machine controller 706 returns to state AR0. In the example shown in FIG. 8, the second return threshold conditions 812 correspond to an inverted value of the third threshold conditions 810. Other suitable conditions or values for the second return threshold conditions 812 are utilized, according to various embodiments.

Figure 9:
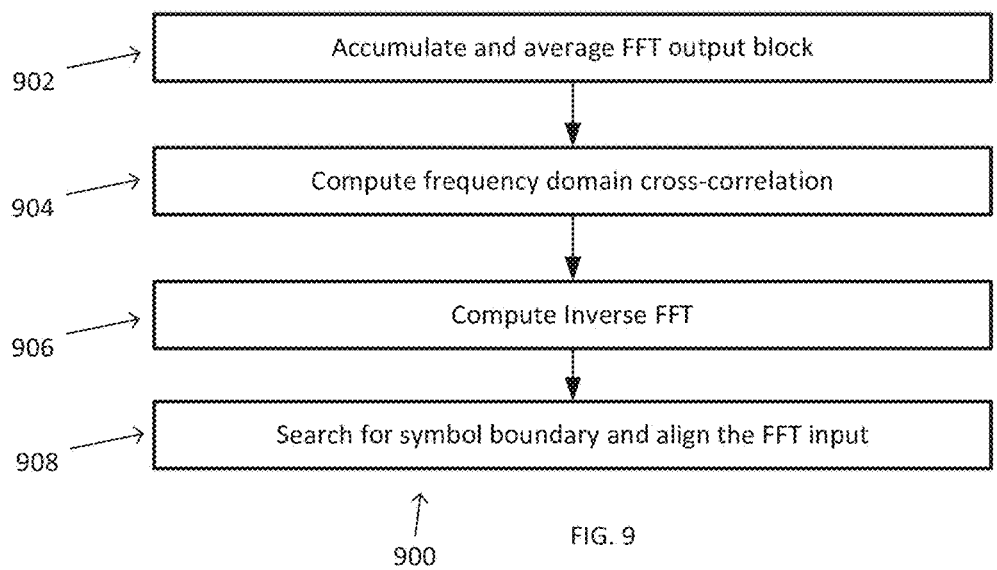
FIG. 9 is a flow diagram of an example method, implemented in the packet detector of FIG. 7, of searching for a symbol boundary, according to an embodiment.

During state AR3_INIT, the packet detector 700 performs steps as shown in FIG. 9. At Step 902, the FFT output blocks are accumulated and averaged. In some embodiments, the accumulation and averaging of the FFT output blocks starts from state AR0. The accumulation and averaging helps to enhance detection sensitivity in a noisy channel. At Step 904, the cross-correlator 600 generates a frequency domain cross-correlation value (e.g., $CR\_FD_k(0:N-1)$). At Step 906, the inverse FFT component 607 performs an inverse fast Fourier transform on the frequency domain cross-correlation output. At step 908, the state machine controller 706 searches for a symbol boundary within the inverse FFT output and adjusts a pointer of the FFT input 712 via the FFT controller 708. The symbol boundary in one example is located by searching for a peak value of the inverse FFT output. In some scenarios, a peak to average power ratio (PAPR) is also calculated. In this scenario, the symbol boundary is valid and thus the packet detection valid only if the PAPR meets a PAPR threshold. If the PAPR threshold is not met, then a false alarm signal is generated by setting an indicator realCIR:=0.

Figure 1:
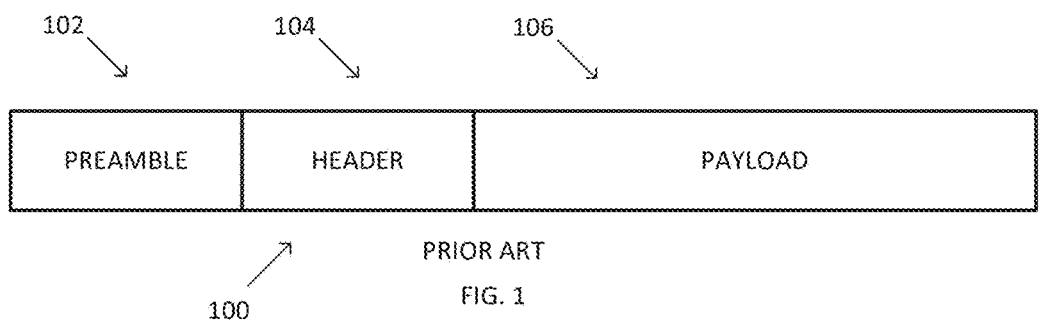
FIG. 1 is a diagram of a packet having a preamble, header, and payload, according to the prior art.
Figure 2:
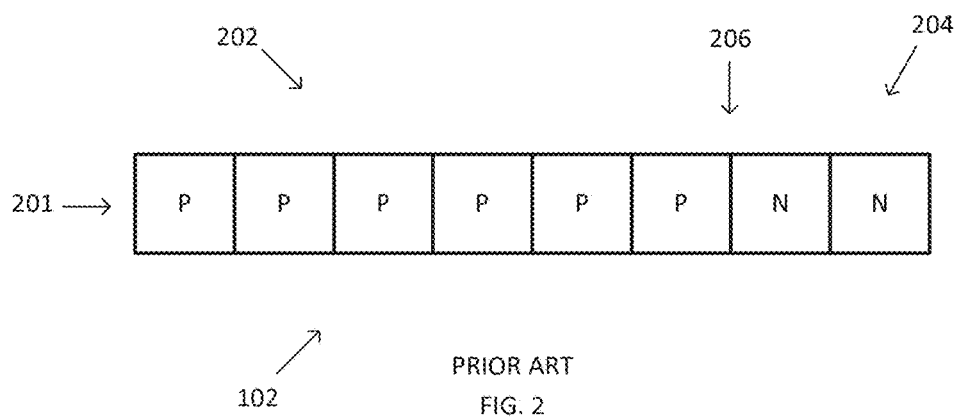
FIG. 2 is a diagram of an example of a preamble of the packet of FIG. 1 according to a scenario.

Referring again to FIG. 8, if the indicator realCIR is set to 1 indicating that a valid packet has been detected, then the state machine controller 706 advances to an AR_UPD state. During the AR_UPD state, the FFT input 712 has been aligned to the correct symbol boundary. The auto-correlator 716 continues to calculate frequency domain auto-correlation values (e.g., arFreq4). As shown in FIG. 2, the preamble 102 contains a transition boundary 206 from positive to negative. Accordingly, the state machine controller 706 determines (820) that the transition boundary 206 is detected when arFreq4 meets (e.g., becomes less than) a transition threshold arFreqThd40. When the transition threshold arFreqThd40 is met, the state machine controller 706 provides an indication of the packet detection (e.g., PcktDetected is set to "1") and advances to the AR_DONE state. While the transition threshold has not been met, the state machine controller 706 determines (822) whether a transition timeout reg_sync_num_time_out has been met. While the transition timeout has not been met, the state machine controller 706 waits in state AR_UPD. If the transition timeout is met, then the state machine controller 706 returns to the state AR0.

In the scenario described above, the state machine controller 706 compares the mean square values avgNorm0, avgNorm1, avgNorm2, and avgNorm3 with a same threshold (i.e., reg_sync_avgnorm_min). In other embodiments and/or scenarios, the state machine controller 706 uses different thresholds for one or more of the states.

Figure 10:
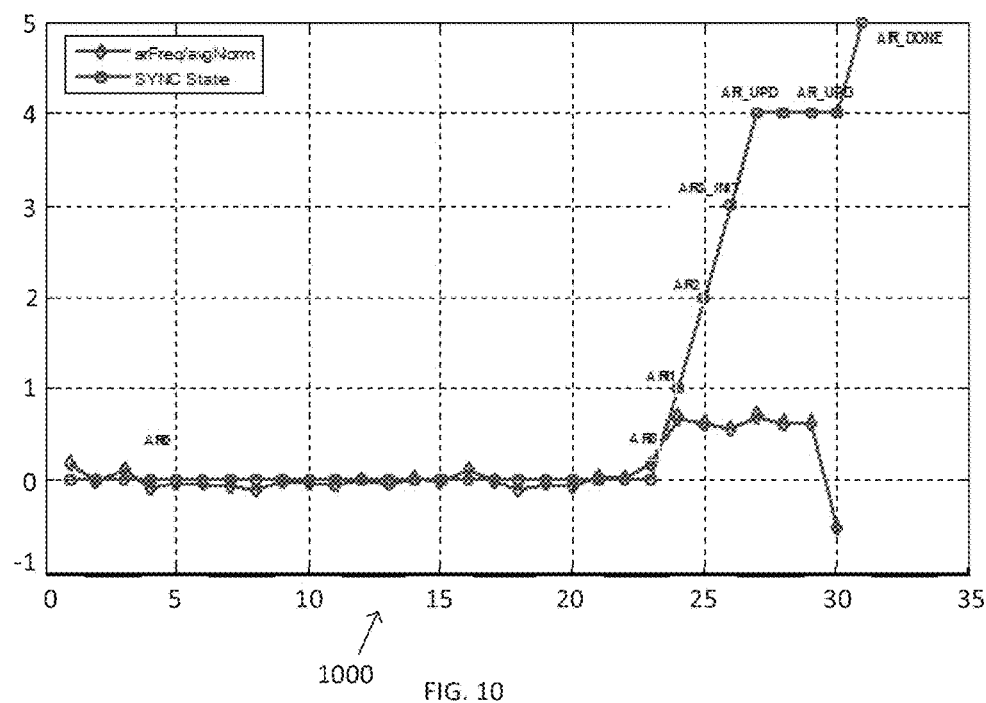
FIG. 10 is a diagram of state transitions according to one example of the method of FIG. 8.

FIG. 10 is a diagram 1000 illustrating state transitions according to one example of the method of FIG. 8. As shown in FIG. 10, a vertical axis is the output of the auto-correlator 716 and the horizontal axis is the time domain (e.g., the number of symbols processed). In the example shown in FIG. 10, the first symbol of the preamble is detected on the $23^{rd}$ symbol and a packet is detected after 31 symbols.

Various devices described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable medium or media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Where the elements of embodiments of the invention are implemented using a processor executing software and/or firmware instructions, such software instructions may be written with any suitable programming or scripting language such as C, C++, JAVA®, assembler, or the like, with the various algorithms being implemented with any suitable combination of data structures, objects, processes, routines or other programming elements. Functional aspects may be implemented in algorithms that execute on one or more processors.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an application-specific integrated circuit (ASIC), a programmable logic device (PLD), etc.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

What is claimed is:

1. A method of detecting a packet in an input data stream, the method comprising:
   scanning, by one or more integrated circuits of a packet detector, a stream of fast Fourier transform (FFT) blocks, corresponding to the input data stream, for a plurality of candidate symbols for a preamble of the packet;
   detecting a symbol boundary between adjacent candidate symbols of the plurality of candidate symbols and aligning the FFT blocks with the symbol boundary, including:
      accumulating and determining, by the one or more integrated circuits, an average of at least two FFT blocks of the stream of FFT blocks,
      determining, by the one or more integrated circuits, a frequency domain cross-correlation output based on the average,
      determining, by the one or more integrated circuits, an inverse FFT output of the frequency domain cross-correlation output,
      detecting, by the one or more integrated circuits, the symbol boundary based on a peak value of the inverse FFT output, and
      aligning, by the one or more integrated circuits, the FFT blocks of the stream of FFT blocks based on the detected symbol boundary;
   detecting, by the one or more integrated circuits, a transition boundary between different adjacent candidate symbols of the preamble based on the detected symbol boundary; and
   providing, by the one or more integrated circuits, a packet detection indication based on the detected transition boundary.

2. The method of claim 1, further comprising receiving a narrow-band interference indication;
   wherein scanning the stream of FFT blocks comprises scanning the stream of FFT blocks while omitting at least one sub-carrier frequency corresponding to the narrow-band interference indication.

3. The method of claim 1, wherein scanning the stream of FFT blocks comprises determining whether first threshold conditions are met for a first candidate symbol of the plurality of candidate symbols, the first threshold conditions indicating whether a first auto-correlation output for a first FFT block of the stream of FFT blocks meets a first auto-correlation threshold.

4. The method of claim 3, the first threshold conditions further indicating whether an average input power of the first FFT block meets a first average power threshold.

5. The method of claim 4, wherein scanning the stream of FFT blocks comprises determining whether second threshold conditions are met for a second candidate symbol of the plurality of candidate symbols, the second threshold conditions indicating i) whether a second auto-correlation output for a second FFT block of the stream of FFT blocks meets a second auto-correlation threshold and ii) whether a second average input power of the second FFT block meets a second average power threshold.

6. The method of claim 5, wherein the second auto-correlation threshold is higher than the first auto-correlation threshold.

7. The method of claim 5, wherein scanning the stream of FFT blocks comprises determining whether third threshold conditions are met for a third candidate symbol of the plurality of candidate symbols, the third threshold conditions indicating i) whether a third auto-correlation output for a third FFT block of the stream of FFT blocks meets a third auto-correlation threshold and ii) whether a third average input power of the third FFT block meets a third average power threshold;
   wherein detecting the symbol boundary comprises detecting the symbol boundary based on the first and second candidate symbols.

8. The method of claim 5, wherein scanning the stream of FFT blocks comprises determining whether a bypass threshold condition is met, the bypass threshold condition indicating that a detection confidence for the first candidate symbol and the second candidate symbol meets a high confidence threshold;
   if the bypass threshold condition is met, bypassing a determination of whether third threshold conditions are met for a third candidate symbol and detecting the symbol boundary based on the first and second candidate symbols.

9. The method of claim 5, wherein scanning the stream of FFT blocks comprises returning to determine whether the first threshold conditions are met for a third candidate symbol of the plurality of candidate symbols if return threshold conditions are not met.

10. The method of claim 1, wherein detecting the transition boundary comprises determining whether a frequency domain auto-correlation value for an FFT block of the stream of FFT blocks meets a transition threshold that indicates a polarity change.

11. A method of detecting a symbol boundary for a preamble of a packet in an input data stream, the method comprising:
   accumulating and determining, by one or more integrated circuits of a packet detector, an average of a plurality of fast Fourier transform (FFT) blocks of a stream of FFT blocks that correspond to the input data stream;
   determining, by the one or more integrated circuits, a frequency domain cross-correlation output based on the average of the plurality of FFT blocks;
   determining, by the one or more integrated circuits, an inverse FFT output of the frequency domain cross-correlation output; and
   detecting, by the one or more integrated circuits, the symbol boundary based on a peak value of the inverse FFT output.

12. The method of claim 11, further comprising receiving a narrow-band interference indication;
   wherein accumulating and determining the average of the at least two FFT blocks and determining the frequency domain cross-correlation output are performed while omitting at least one sub-carrier frequency corresponding to the narrow-band interference indication.

13. The method of claim 11, further comprising:
   scanning the stream of fast Fourier transform (FFT) blocks for a plurality of candidate symbols for the preamble of the packet;
   wherein accumulating and determining the average of the plurality of FFT blocks is performed after at least one auto-correction threshold has been met for at least one candidate symbol.

14. The method of claim 11, further comprising:
   aligning the FFT blocks of the stream of FFT blocks based on the detected symbol boundary; and
   detecting a transition boundary for the preamble by determining whether a frequency domain auto-correlation value for an FFT block of the stream of FFT blocks meets a transition threshold that indicates a polarity change of the frequency domain auto-correlation value.

15. A device that detects a symbol boundary for a preamble of a packet in an input data stream, the device comprising:
   a fast Fourier transform (FFT) component that generates a stream of FFT blocks based on the input data stream;
   a cross-correlator that generates a frequency domain cross-correlation output based on an average of a plurality of the stream of FFT blocks;
   an inverse FFT component that determines an inverse FFT output of the frequency domain cross-correlation output; and
   a state machine controller that detects the symbol boundary based on a peak value of the inverse FFT output.

16. The device of claim 15, wherein the cross-correlator determines the frequency domain cross-correlation output while omitting at least one sub-carrier frequency corresponding to a received narrow-band interference indication.

17. The device of claim 15, further comprising:
   an auto-correlator that scans the stream of FFT blocks for a plurality of candidate symbols and generates a frequency domain auto-correlation output;
   wherein the state machine controller detects a first candidate symbol of the plurality of candidate symbols based on whether first threshold conditions are met, the first threshold conditions indicating whether a first frequency domain auto-correlation output for a first FFT block of the stream of FFT blocks meets a first auto-correlation threshold.

18. The device of claim 17, wherein the state machine controller detects a second candidate symbol of the plurality of candidate symbols based on whether second threshold conditions are met, the second threshold conditions indicating whether a second frequency domain auto-correlation output for a second FFT block of the stream of FFT blocks meets a second auto-correlation threshold.

19. The device of claim 15, wherein the state machine controller:
   aligns the stream of FFT blocks based on the detected symbol boundary; and
   detects a transition boundary for the preamble by determining whether a frequency domain auto-correlation value for an FFT block of the stream of FFT blocks meets a transition threshold that indicates a polarity change of the frequency domain auto-correlation value.

* * * * *